US009517883B1

(12) United States Patent
Pedersen (10) Patent No.: US 9,517,883 B1
(45) Date of Patent: Dec. 13, 2016

(54) METHODS AND SYSTEMS FOR WASTE MANGEMENT (71) Applicant: The Boeing Company, Huntington Beach, CA (US)

(72) Inventor: Aaron John Pedersen, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/718,731

(22) Filed: May 21, 2015

(51) Int. Cl.
| B65G 11/16 | (2006.01) |
| B65F 1/14 | (2006.01) |
| B65D 43/16 | (2006.01) |
| B65D 43/26 | (2006.01) |

(52) U.S. Cl.
CPC .......... B65F 1/14 (2013.01); B65D 43/16 (2013.01); B65D 43/26 (2013.01); B65G 11/16 (2013.01)

(58) Field of Classification Search
CPC ......... B65G 65/00; B65G 11/00; B65G 11/10; B65G 11/106
USPC .............. 193/20, 21, 25 C, 28, 33, 34, 2 R
See application file for complete search history.

(56) References Cited

U.S. PATENT DOCUMENTS

| 4,108,498 | A | * | 8/1978 | Bentsen | B65F 5/005 137/614.21 |
| 5,083,704 | A | * | 1/1992 | Rounthwaite | B65F 1/0093 15/314 |
| 5,221,010 | A | * | 6/1993 | Bianco | B07C 7/04 193/2 R |
| 5,253,766 | A | * | 10/1993 | Sims | B07C 7/00 193/2 A |
| 5,316,152 | A | | 5/1994 | Ross | |
| 5,492,227 | A | * | 2/1996 | Millette | B65F 1/0093 209/703 |
| 5,667,136 | A | | 9/1997 | Chen | |
| 5,772,112 | A | * | 6/1998 | Bulcroft | E04F 17/10 232/44 |
| 5,806,759 | A | | 9/1998 | Axisa | |
| 6,810,819 | B2 | | 11/2004 | Kaniuk et al. | |
| 7,690,493 | B1 | | 4/2010 | Nunis | |
| 8,523,051 | B2 | * | 9/2013 | Clancy | B65F 1/0093 193/34 |
| 2009/0126473 | A1 | * | 5/2009 | Porat | B65F 1/1426 73/149 |

(Continued)

FOREIGN PATENT DOCUMENTS

| WO | 9320006 A1 | 10/1993 |
| WO | 2006123123 A1 | 11/2006 |

(Continued)

Primary Examiner — James R Bidwell
(74) Attorney, Agent, or Firm — Armstrong Teasdale LLP (57) ABSTRACT A waste management system for transferring waste from an elevated platform to a ground level includes a waste disposal station coupled to the platform such that the waste disposal station is configured to receive the waste from a technician. The waste management system also includes at least one chute coupled to the waste disposal station such that the at least one chute configured to channel the waste downward from the waste disposal station. The waste management system also includes at least one container coupled to the at least one chute. The at least one container is located at the ground level and is configured to collect the waste deposited in the at least one chute at the waste disposal station.

18 Claims, 5 Drawing Sheets

(56) References Cited

U.S. PATENT DOCUMENTS

2009/0314665 A1 12/2009 Konstantinos
2012/0321395 A1 12/2012 Alfrost

FOREIGN PATENT DOCUMENTS

| WO | 2013072655 A1 | 5/2013 |
| WO | 2014029903 A1 | 2/2014 |
| WO | 2014114849 A1 | 7/2014 |
| WO | 2015015053 A1 | 2/2015 |
| WO | 2015015054 A1 | 2/2015 |
| WO | 2015015055 A1 | 2/2015 |

* cited by examiner

METHODS AND SYSTEMS FOR WASTE MANGEMENT

BACKGROUND

The field of the disclosure relates generally to waste management systems, and more specifically, to transferring waste from an elevated platform to ground level.

At least some known manufacturing facilities include elevated platforms that provide technicians access to a specified work site on a product, such as an aircraft. As the technicians perform their duties, an amount of waste is generated that requires sorting into various categories. For example, when working on an aircraft, waste is generally sorted into three different types: flammable waste, corrosive waste, and general foreign object debris (FOD) waste. At least some known facilities store a separate waste container for each waste type on the platform.

A waste collection team is responsible for emptying the waste containers, often multiple times per day, on each platform. At least some known manufacturing facilities require the waste collection team to ascend a set of platform stairs to retrieve a waste container and descend the stairs, while carrying the heavy waste container, to empty the waste container at ground level. The waste collection team then ascends the stairs to replace the first waste container and retrieve a second waste container. As a result, members of the waste collection team may ascend and descend stairs between 75-100 times per day. Furthermore, the waste collection team is often carrying a waste container each time they ascend and descend the stairs, which may lead to a loss of balance or other safety concern.

Additionally, storing the waste containers on the platform itself limits the space available to the technicians to move around on the platform and perform their duties and also represents a possible trip hazard for the technicians.

BRIEF DESCRIPTION

In one aspect, a waste management system for transferring waste from an elevated platform to a ground level is provided. The waste management system includes a waste disposal station coupled to the platform such that the waste disposal station is configured to receive the waste from a technician. The waste management system also includes at least one chute coupled to the waste disposal station such that the at least one chute configured to channel the waste downward from the waste disposal station. The waste management system also includes at least one container coupled to the at least one chute. The at least one container is located at the ground level and is configured to collect the waste deposited in the at least one chute at the waste disposal station.

In another aspect, a containment lid assembly is provided. The containment lid assembly includes a chute biasing portion, a lid coupled to the chute biasing portion, and a container selectively coupled to the lid. The biasing portion is configured to apply a downward biasing force on the container to maintain engagement of the lid and the container.

In yet another aspect, a method of assembling a waste management system for transferring waste from an elevated platform to a ground level is provided. The method includes coupling a waste disposal station to the platform such that the waste disposal station is configured to receive the waste from a technician. The method also includes coupling at least one chute to the waste disposal station such that the at least one chute is configured to channel the waste downward from the waste disposal station. At least one container is then coupled to the at least one chute. The at least one container is located at the ground level and is configured to collect the waste deposited in the at least one chute at the waste disposal station.

The features, functions, and advantages that have been discussed can be achieved independently in various embodiments or may be combined in yet other embodiments, further details of which can be seen with reference to the following description and drawings.

DETAILED DESCRIPTION

The embodiments described herein facilitate depositing various types of waste into a respective chute on a platform and collecting the waste in containers located at ground level. A technician determines whether they have FOD (foreign object debris) waste, corrosive waste, or flammable waste and deposits the waste into an appropriate chute at a waste disposal station located on the platform. The waste then travels through the chute and into a corresponding container located at ground level. When the container is full, another technician removes the lid from the container such that the lid remains coupled to a biasing portion of the chute while the technician empties the container. Once the container is emptied, the technician at least partially compresses the biasing portion of the chute to lift the lid above the container and then couples the lid to the container. A coil within the biasing portion causes the lid to apply a downward force onto the container to maintain a tight engagement.

Figure 1:
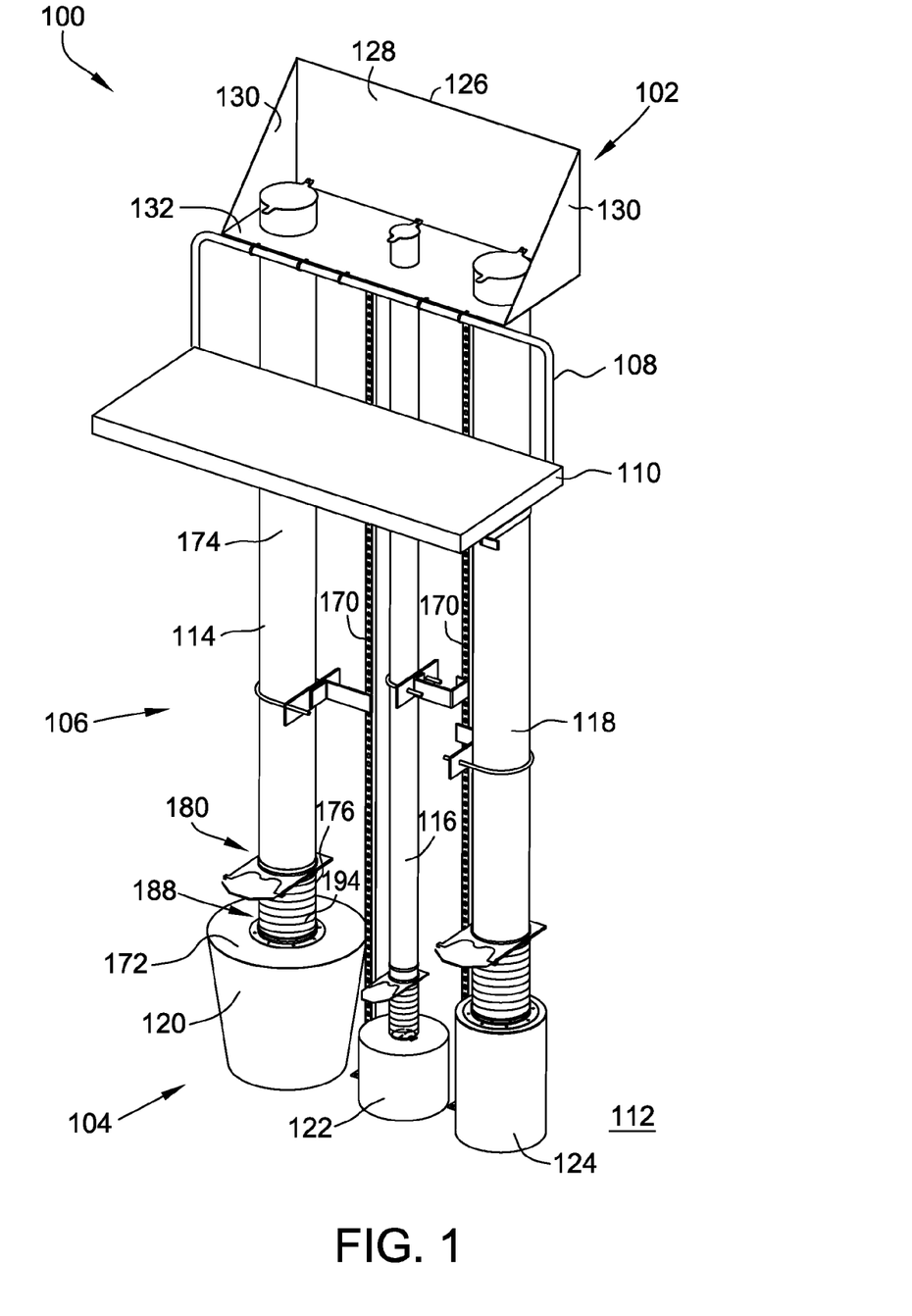
FIG. 1 is a perspective view of an exemplary waste management system.

FIG. 1 is a perspective view of an exemplary waste management system 100. In the exemplary implementation, system 100 includes a waste disposal station 102, a plurality of waste containers 104, and a plurality of chutes 106 coupled between station 102 and a respective container 104. System 100 is used to transfer waste from waste disposal station 102 and through plurality of chutes 106 for disposal in plurality of containers 104. In the exemplary implementation, waste disposal station 102 is coupled to a railing 108 of an elevated platform 110, and containers are located at ground level 112 such that the waste generated by technicians working on platform 110 is channeled through chutes 106 to ground level 112.

In the exemplary implementation, plurality of chutes 106 includes a first chute 114, a second chute 116, and a third chute 118. Similarly, plurality of containers 104 includes a first container 120 coupled to first chute 114, a second container 122 coupled to second chute 116, and a third container 124 coupled to third chute 118. First chute 114 channels general foreign object debris (FOD) waste between waste disposal station 102 at platform 110 and first container 120, while second chute 116 channels flammable waste, and third chute 118 channels corrosive waste. According to federal Occupational Safety and Health Administration (OSHA) regulations, different types of waste must be separated and clearly identified by color. More specifically, second container 122 is colored red to indicate flammable materials contained therein, while third container 124 is colored yellow to indicate corrosive materials contained therein. Although waste management system 100 illustrates three separate chutes and containers in FIG. 1, in other implementations, waste management system 100 may include only a single chute and associated container. Generally, waste management system 100 may include any number of chutes and associated containers as desired.

Figure 2:
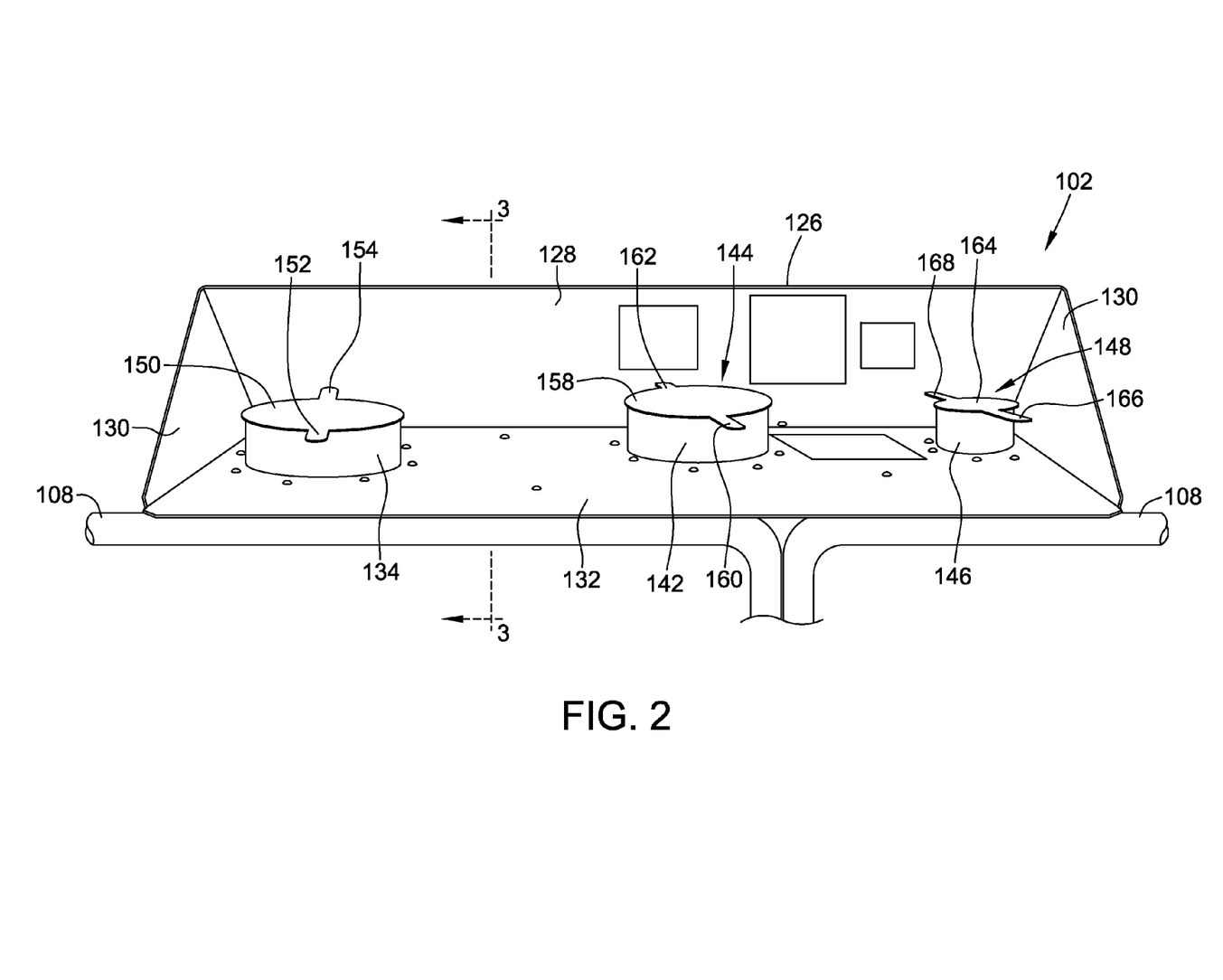
FIG. 2 is a perspective view of an exemplary waste disposal station that may be used with the waste management system shown in FIG. 1.
Figure 3:
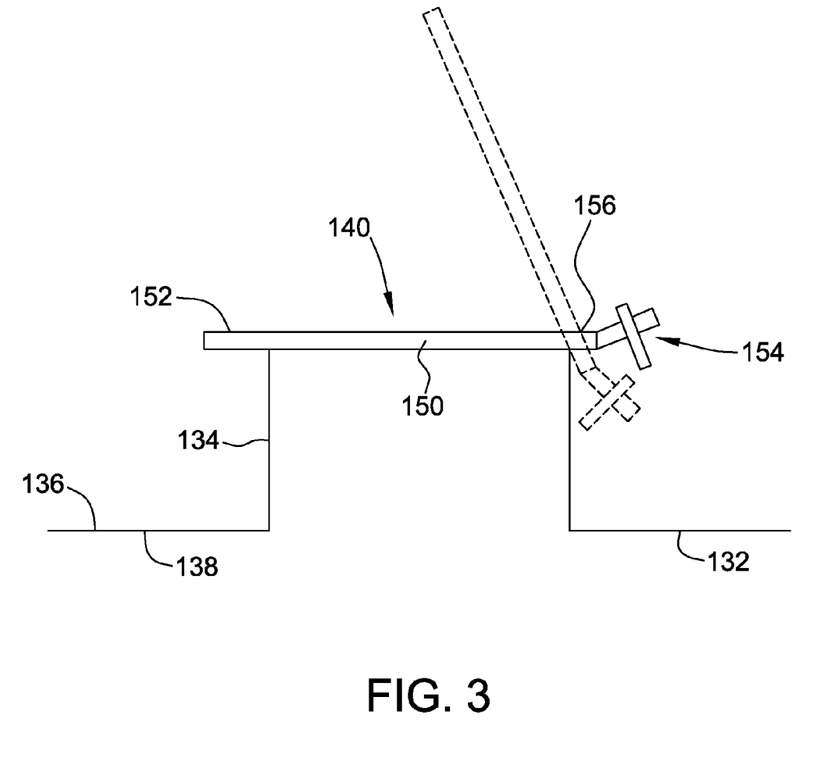
FIG. 3 is a cross-sectional view of a portion of the waste disposal station taken along line 3-3 in FIG. 2.

FIG. 2 is a perspective view of waste disposal station 102 that may be used with waste management system 100 (shown in FIG. 1), and FIG. 3 is a side view of a portion of waste disposal station 102. In the exemplary implementation, waste disposal station 102 is coupled to railing 108 such that station 102 overhangs railing 108. As such, a technician working on platform 110 (shown in FIG. 1) is able to utilize substantially an entire area of platform 110 without any portion of waste management system 100 interfering. Waste disposal station 102 includes a housing 126 that includes a rear wall 128, a pair of sidewalls 130, and a bottom wall 132. Walls 128, 130, and 132 of housing 126 are configured to reduce a risk of waste falling from platform 110 to ground level 112 below. In the exemplary implementation, housing 126 is formed from a lightweight, non-corrosive material, such as, but not limited to, aluminum. Alternatively, housing 126 is formed from any material that enables operation of waste disposal station 102 as described herein.

In one implementation, first chute 114 includes a top end 134 that extends upwards through bottom wall 132 of housing 126. As such, both a top surface 136 and a bottom surface 138 of bottom wall 132 are coupled to top end 134 to provide structural integrity to first chute 114. Furthermore, top end 134 also defines an opening 140 into which the technicians may deposit the waste. Similarly, second chute 116 includes a top end 142 that extends through bottom wall 132 and defines an opening 144 and third chute 118 includes a top end 146 that extends through bottom wall 132 and defines an opening 148. Alternatively, chutes 114, 116, and 118 are coupled to housing 126 in any manner that enable operation of waste disposal station 102 as described herein.

Additionally, top end 134 of first chute 114 includes a lid 150 that is selectively movable by a technician between a first position, shown in solid lines in FIG. 3, and a second position, shown in broken lines in FIG. 3. Lid 150 includes a handle 152 and a stopper mechanism 154. Handle 152 is engaged manually by a technician to lift lid 150 from opening to allow the technician to deposit waste into first chute 114. As the technician lifts handle 152, lid 150 pivots about a hinge axis 156 until stopper mechanism 154 contacts top end 134. In the exemplary implementation, stopper mechanism 154 contacts top end 134 before lid 150 has pivoted 90 degrees. As such, stopper mechanism 154 prevents lid 150 from being opened past a predetermined point such that lid 150 cannot remain in the opened second position when not being manually held open by a technician. Alternatively, stopper mechanism 154 may extend from the outer surface of top end 134 and contact lid 150 when the technician lifts lid 150 to a predetermined position.

In operation, lid 150 covers opening 140 and prevents any vapors or airborne particles from rising through first chute 114 and escaping through opening 140 at top end 134. Similarly, second chute 116 includes a lid 158 that includes a handle 160 and a stopper 162, and third chute 118 includes a lid 164 that includes a handle 166 and a stopper 168. In the exemplary implementation, lids 150, 158, and 164 are each colored a different color to indicate which type of waste is meant to be deposited therein. For example, lid 150 on first chute 114 is colored grey to indicate general FOD waste, lid 158 on second chute 116 is colored red to indicated flammable waste, and lid 164 on third chute 118 is colored yellow to indicate corrosive waste. As such, lids 150, 158 and 164 are colored in accordance with OSHA regulations to indicate a specific type of waste to be deposited therein.

Referring again to FIG. 1, waste management system 100 includes at least one support beam 170 that supports the weight of waste disposal station 102. In the exemplary implementation, supports beams 170 are substantially parallel to each chute 106 and extend between bottom wall 132 of housing 126 and ground level 112. In another suitable implementation, such as when platform 110 and railing 108 are moveable, support beams 170 extend between bottom wall 132 and at least one of railing 108 and platform 110 to allow for mobility of platform 110.

Except as specifically described otherwise, chutes 114, 116, and 118 of plurality of chutes 106 are substantially similar to each other. As such, only first chute 114 is described herein in detail. However, second and third chutes 116 and 118 include similar features and components. First chute 114 extends between waste disposal station housing 126 and a lid 172 of first container 120. In the exemplary implementation, first chute 114 includes a rigid portion 174 and a biasing portion 176. Rigid portion 174 is coupled to housing bottom wall 132 and includes top end 134. Biasing portion 176 is coupled to lid 172. In the exemplary implementation, rigid portion 174 may be formed from at least two rigid sections. In such a configuration, the rigid sections are coupled together using a clamp 178 (shown in FIG. 4) such that no portion of a fastener extends through rigid portion 174 and into the channel through which the waste travels. Alternatively, adjacent rigid sections of rigid portion 174 are coupled together in any manner to enable operation of waste management system 100 as described herein. Furthermore, rigid portion 174 is formed from a metallic material, such as, but not limited to, aluminum, such that rigid portion 174 is a relatively lightweight, non-corrosive material. Biasing portion 176 is formed from a translucent or transparent, fire-resistant material that enables a technician to observe when container 120 is full or if biasing portion 176 is clogged with waste. Alternatively, portions 174 and 176 are formed from any material that facilitates operation of chute 114 as described herein.

Figure 4:
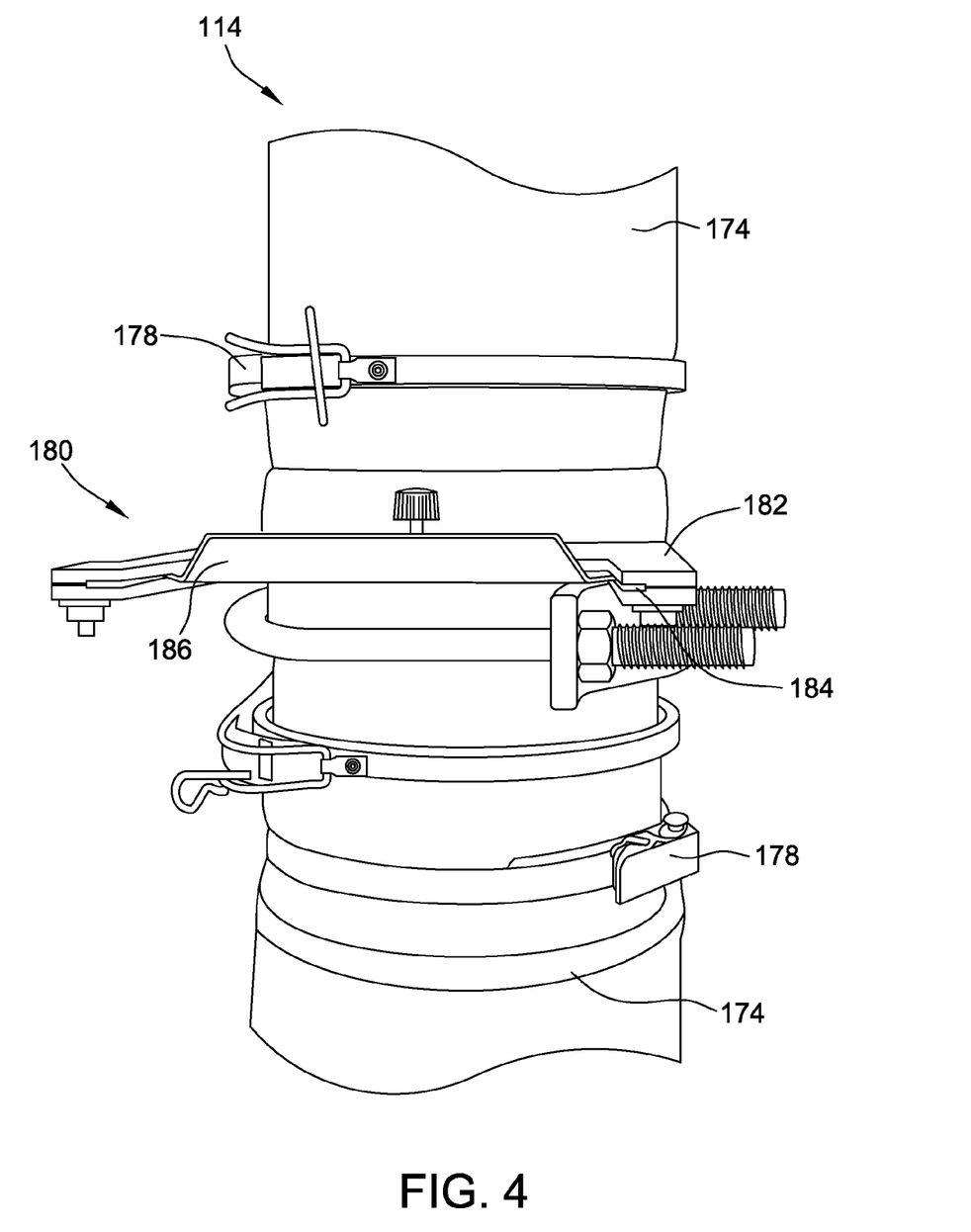
FIG. 4 is a side view of an exemplary chute gate assembly that may be used with the waste management system shown in FIG. 1.

In the exemplary implementation, chute 114 also includes a gate assembly 180 coupled between rigid portion 174 and biasing portion 176 of chute 114, as shown in FIG. 1. Alternatively, gate assembly 180 is coupled between adjacent rigid sections of rigid portion 174, as shown in FIG. 4. Gate assembly 180 includes a housing 182 coupled between adjacent portions of chute 114. Housing 182 defines a slot 184 that is configured to receive a gate 186 therein. Gate 186 is configured to selectively slide into and out of slot 184 to selectively block chute 114 when a technician is in the process of emptying container 120. As such, technicians working on platform 110 may continue to use waste disposal station 102 to deposit waste even during emptying of containers 104 at ground level 112. When container 120 is emptied and replaced, the technician slides gate 186 partially out of slot 184 to allow any waste deposited during emptying of container 120 to fall into container 120.

In the exemplary implementation, waste management system 100 also includes a containment lid assembly 188 to substantially contain any vapors and/or airborne particles within container 120 and prevent such vapor from traveling up chute 114. Containment lid assembly 188 includes biasing portion 176, a coupling 190 (shown in FIG. 5), lid 172, and container 120. Coupling 190 couples a bottom end (not shown) of biasing portion 176 to lid 172 with a plurality of fasteners 192. Alternatively, biasing portion 176 is coupled to lid 172 in any manner that facilitates operation of containment lid assembly 188 as described herein. In the exemplary implementation, biasing portion 176 includes a flexible coil 194 that enables biasing portion 176 to stretch and compress in length. In operation, when lid 172 is coupled to container 120 in a snap fit relationship, coil 194 is compressed from a resting length to a shorter compressed length such that coil 194 biases lid 172 downward onto container 120. As such, biasing portion 176 applies a positive pressure to lid 172 that maintains engagement between lid 172 and container 120. A technician may easily break the biased engagement and lift lid 172 from container 120 when container 120 is to be emptied. When lid 172 and container 120 are decoupled, lid 172 then remains coupled to biasing portion 176 as biasing portion 176 extends into its resting length until the technician again compresses coil 194 in biasing portion 176 to couple lid 172 to container 120.

Figure 5:
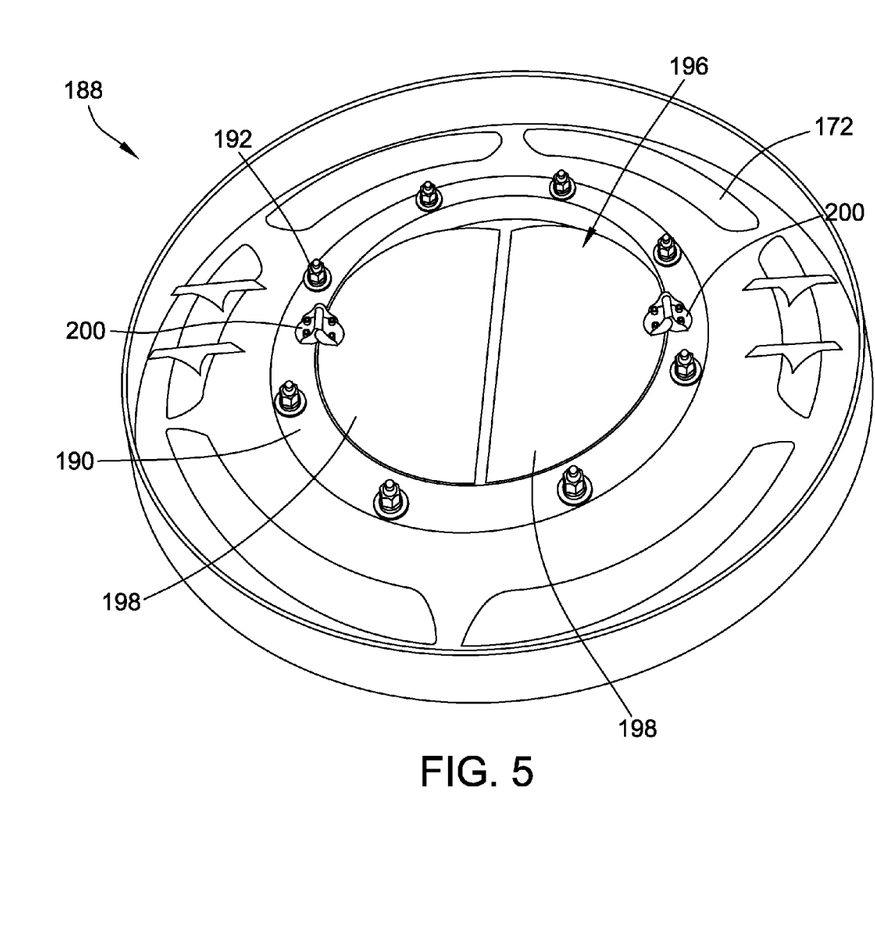
FIG. 5 is a bottom view of a portion of an exemplary biasing lid assembly that may be used with the waste management system shown in FIG. 1.

FIG. 5 is a bottom view of lid 172 illustrating a portion of lid containment assembly 188. In the exemplary implementation, containment assembly 188 includes coupling 190 that defines an opening 196 in lid 172. Furthermore, assembly 188 includes a pair of flaps 198 coupled to coupling 190 with a respective hinge 200. Hinges 200 are oriented opposite each other on coupling 190 and enable each flap 198 to pivot about its respective hinge 200 to selectively open and close opening 196. When flaps 198 are closed, vapors or airborne particles in the waste within container 120 are substantially prevented from traveling up chute 114.

In operation, when a technician deposits waste into chute end 134 (shown in FIG. 2) at waste disposal station 102 (shown in FIG. 2), the waste falls down chute 114 and passes gate assembly 180 when gate 186 (both shown in FIG. 4) is in the open position. The waste then impinges on flaps 198, which causes flaps 198 to pivot about hinges 200 and allow the waste to travel through opening 196 and be deposited into container 120. After the waste falls through opening 196, hinges 200 cause flaps 198 return to the at rest position to substantially prevent vapors or airborne particles in the waste from traveling up chute 114. As described above, each of chutes 116 and 118 includes a gate assembly and a containment lid assembly similar to assemblies 180 and 188 as described with respect to chute 114. Alternatively, chutes 114, 116, and 118 have any combination of assemblies 180 and 188 that enables waste management system to operate as described herein.

The embodiments described herein facilitate depositing various types of waste into a respective chute on a platform and collecting the waste in containers located at ground level. A technician determines whether they have FOD waste, corrosive waste, or flammable waste and deposits the waste into the appropriate chute at a waste disposal station on the platform. The waste then travels through the chute and into a corresponding container located at ground level. When the container is full, another technician slides the gate inward to block the chute and removes the lid from the container. The lid remains coupled to the biasing portion of the chute while the technician empties the container. Once the container is emptied, the technician at least partially compresses the biasing portion of the chute to lift the lid above the container and then couples the lid to the container. The coil within the biasing portion causes the lid to apply a downward force onto the container to maintain a tight engagement.

As described herein, the waste management system allows technicians to deposit waste into an appropriate chute from a working platform such that the waste collects in containers at ground level. Therefore, technicians responsible for emptying the container are no longer required to climb a set of stairs onto the platform to empty the containers. Storing the containers at ground level provides cost savings in that technicians do not have to climb stairs 75-100 times per day as with at least some known waste management systems. Furthermore, any potential safety risks from the technicians carrying containers or bags of waste down from the platform are mitigated. Additionally, storing the containers at ground level and providing an over-the-rail waste disposal station provides for additional work space on the platforms for the technicians to perform their duties without the risk of tripping on one of the containers.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A waste management system for transferring waste from an elevated platform to a ground level, said waste management system comprising:
    a waste disposal station coupled to the platform, said waste disposal station configured to receive the waste from a technician;
    at least one chute coupled to said waste disposal station, said at least one chute configured to channel the waste downward from said waste disposal station;
    a gate assembly coupled to said at least one chute, said gate assembly comprising:
        a housing configured to define a slot; and
        a gate positioned within said slot, wherein said gate is moveable between a first position and a second position to selectively obstruct said at least one chute; and
    at least one container coupled to said at least one chute, said at least one container located at the ground level and configured to collect the waste deposited in said at least one chute at said waste disposal station.

2. The waste management system according to claim 1 further comprising a containment lid assembly comprising:
    a biasing portion of said at least one chute; and a lid coupled to said biasing portion and selectively coupled to said at least one container, wherein said biasing portion is configured to apply a downward biasing force on said at least one container to maintain engagement of said lid and said at least one container.

3. The waste management system according to claim 2, wherein said biasing portion comprises a coil that is selectively moveable between an at rest position and a compressed position, wherein, when said lid is coupled to said at least one container, said coil is in the compressed position to apply the biasing force to said at least one container.

4. The waste management system according to claim 2 further comprising a coupling coupled between said lid and said biasing portion, wherein said coupling defines an opening in said lid.

5. The waste management system according to claim 4 further comprising at least one flap pivotally coupled to said coupling, wherein said at least one flap is pivotable between a first position and a second position to selectively obstruct the opening.

6. The waste management system according to claim 1, wherein said at least one chute comprises a top end coupled to said waste disposal station such that said top end defines an opening configured to receive the waste, wherein said waste disposal station comprises a lid coupled to said top end.

7. The waste management system according to claim 6, wherein said lid is pivotally movable between a first position and a second position to selectively obstruct the opening.

8. The waste management system according to claim 6, wherein said lid includes a stopper mechanism configured to prevent said lid from pivoting beyond a predetermined position.

9. The waste management system according to claim 1, wherein said at least one chute comprises a first chute associated with a first waste type, a second chute associated with a second waste type, and a third chute associated with a third waste type.

10. A containment lid assembly comprising:
a chute biasing portion coupled to at least one chute;
a gate assembly coupled to said at least one chute, said gate assembly comprising:
a housing configured to define a slot; and
a gate positioned within said slot, wherein said gate is moveable between a first position and a second position to selectively obstruct said at least one chute;
a lid coupled to said chute biasing portion; and
a container selectively coupled to said lid, wherein said biasing portion is configured to apply a downward biasing force on said container to maintain engagement of said lid and said container.

11. The containment lid assembly according to claim 10, wherein said chute biasing portion comprises a coil that is selectively moveable between an at rest position and a compressed position.

12. The containment lid assembly according to claim 11, wherein, when said lid is coupled to said container, said coil is in the compressed position to apply the biasing force to said container.

13. The containment lid assembly according to claim 10 further comprising a coupling coupled between said lid and said chute biasing portion, wherein said coupling defines an opening in said lid.

14. The containment lid assembly according to claim 13 further comprising at least one flap pivotally coupled to said coupling, wherein said at least one flap is pivotable between a first position and a second position to selectively obstruct the opening.

15. A method of assembling a waste management system for transferring waste from an elevated platform to a ground level, said method comprising:
coupling a waste disposal station to the platform, wherein the waste disposal station is configured to receive the waste from a technician;
coupling at least one chute to the waste disposal station, wherein the at least one chute is configured to channel the waste downward from the waste disposal station;
coupling a gate assembly housing to the at least one chute, wherein the gate assembly housing defines a slot;
coupling a gate within the slot, wherein the gate is moveable between a first position and a second position to selectively obstruct the at least one chute; and
coupling at least one container to the at least one chute, wherein the at least one container is located at the ground level and is configured to collect the waste deposited in the at least one chute at the waste disposal station.

16. The method according to claim 15 further comprising:
coupling a biasing portion of the at least one chute to a container lid; and
coupling the container lid to the at least one container, wherein the biasing portion is configured to apply a downward biasing force on the at least one container to maintain engagement of the container lid and the at least one container.

17. The method according to claim 15 further comprising:
coupling a coupling between the container lid and the biasing portion, wherein the coupling defines an opening in the container lid; and
pivotally coupling at least one flap to the coupling, wherein the at least one flap is pivotable between a first position and a second position to selectively obstruct the opening.

18. The method according to claim 15 further comprising coupling a chute lid to a top end of the at least one chute in the waste disposal station, wherein the chute lid is pivotally movable between a first position and a second position to selectively obstruct an opening defined by the top end of the chute.

* * * * *

UNITED STATES PATENT AND TRADEMARK OFFICE
CERTIFICATE OF CORRECTION

PATENT NO. : 9,517,883 B1  
APPLICATION NO. : 14/718731  
DATED : December 13, 2016  
INVENTOR(S) : Pedersen Page 1 of 1

It is certified that error appears in the above-identified patent and that said Letters Patent is hereby corrected as shown below:

On the Title Page

Item (54), TITLE, delete "MANGEMENT" and insert therefor -- MANAGEMENT --.

In the Specification

In Column 1, Line 2, delete "MANGEMENT" and insert therefor -- MANAGEMENT --.

Signed and Sealed this
Seventh Day of February, 2017

Michelle K. Lee
*Director of the United States Patent and Trademark Office*